(12) United States Patent
Awano et al.

(10) Patent No.: US 9,802,354 B2
(45) Date of Patent: Oct. 31, 2017

(54) SHEET PROCESSING APPARATUS, IMAGE FORMING SYSTEM, AND PAIR OF ROTATING MEMBERS

(71) Applicant: FUJI XEROX CO., LTD., Tokyo (JP)

(72) Inventors: Hiroaki Awano, Kanagawa (JP);
Hiroaki Mogi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 216 days.

(21) Appl. No.: 14/713,509

(22) Filed: May 15, 2015

(65) Prior Publication Data

US 2016/0096311 A1    Apr. 7, 2016

(30) Foreign Application Priority Data

Oct. 2, 2014  (JP) .................................. 2014-203874

(51) Int. Cl.
*B65H 45/04*   (2006.01)
*B29C 53/04*   (2006.01)
(Continued)

(52) U.S. Cl.
CPC .......... *B29C 53/043* (2013.01); *B31F 1/0003* (2013.01); *B31F 1/0035* (2013.01); *B31F 1/07* (2013.01); *B65H 45/04* (2013.01); *G03G 15/00* (2013.01); *G03G 15/6544* (2013.01); *B31F 2201/0741* (2013.01); *B31F 2201/0743* (2013.01); *B65H 2801/27* (2013.01); *G03G 2215/00827* (2013.01); *G03G 2215/00877* (2013.01)

(58) Field of Classification Search
CPC ....... B65H 45/04; B65H 2801/27; B31F 1/07; B31F 1/0035; B31F 2201/0741; B31F 2201/0743

USPC ................... 270/32, 45, 58.07; 493/406, 407
See application file for complete search history.

(56) References Cited

U.S. PATENT DOCUMENTS 4,166,613 A * 9/1979 Kort et al. .................... 493/342
7,594,645 B2 * 9/2009 Suzuki et al. .................. 270/37
(Continued)

FOREIGN PATENT DOCUMENTS

EP        469472 A2 *  2/1992
JP       4738312 A    12/1972
(Continued)

OTHER PUBLICATIONS

Communication dated Apr. 19, 2016 from the Japanese Patent Office issued in corresponding Application No. 2014-203874.
(Continued)

*Primary Examiner* — Leslie A Nicholson, III
(74) *Attorney, Agent, or Firm* — Sughrue Mion, PLLC

(57) ABSTRACT

A sheet processing apparatus includes a rotating member, a switching unit, and a pressing unit. The rotating member is rotatable and has a facing portion that faces a fold section of a sheet. The rotating member rotates so as to switch the facing portion to another facing portion. Each facing portion is provided with a protrusion. A set position of the protrusion in an axial direction varies from facing portion to facing portion. The switching unit rotates the rotating member so as to switch the facing portion that faces the fold section. The pressing unit presses the protrusion of the facing portion against the fold section.

4 Claims, 12 Drawing Sheets

(51) Int. Cl.
*B31F 1/00* (2006.01)
*B31F 1/07* (2006.01)
*G03G 15/00* (2006.01)

(56) References Cited

U.S. PATENT DOCUMENTS

| | | | |
|---|---|---|---|
| 7,850,156 B2* | 12/2010 | Iguchi et al. | 270/37 |
| 7,954,797 B2* | 6/2011 | Sasahara | 270/45 |
| 8,162,304 B2* | 4/2012 | Iguchi et al. | 270/45 |
| 8,333,372 B2* | 12/2012 | Awaya et al. | 270/58.07 |
| 8,500,111 B2* | 8/2013 | Terao | 270/45 |
| 2011/0301009 A1 | 12/2011 | Hattori et al. | |
| 2014/0030000 A1* | 1/2014 | Gamo et al. | 399/408 |

FOREIGN PATENT DOCUMENTS

| | | |
|---|---|---|
| JP | 10-34591 A | 2/1998 |
| JP | 2004-059304 A | 2/2004 |
| JP | 2007-045531 A | 2/2007 |
| JP | 2008290869 A | 12/2008 |
| JP | 2011-251811 A | 12/2011 |
| JP | 2015231907 A | 12/2015 |

OTHER PUBLICATIONS

Communication dated Feb. 9, 2016, from the Japanese Patent Office in counterpart application No. 2014-203874.
Communication dated Jul. 4, 2017, from the State Intellectual Property Office of People's Republic of China in counterpart Application No. 201510385886.0.

* cited by examiner

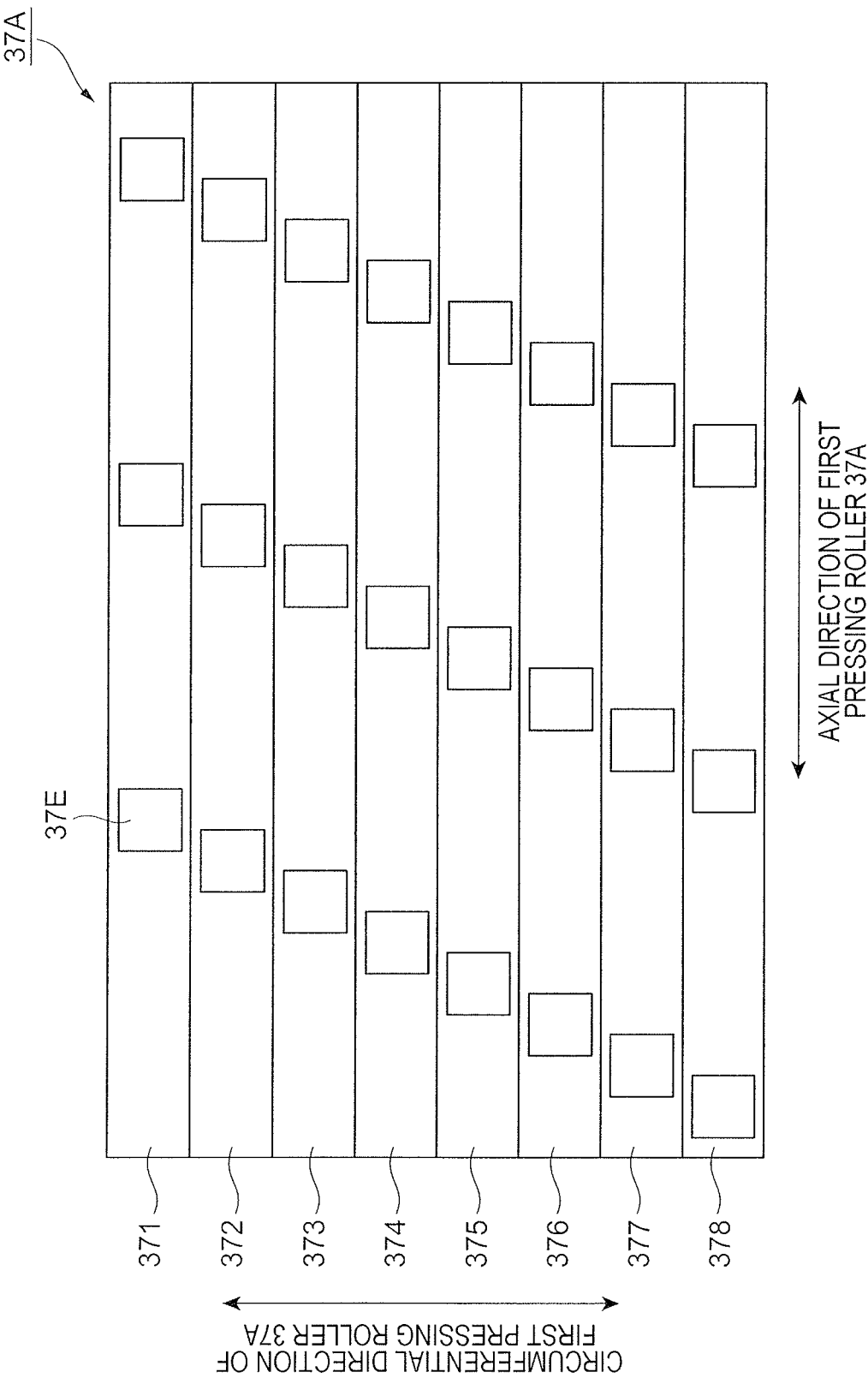

SHEET PROCESSING APPARATUS, IMAGE FORMING SYSTEM, AND PAIR OF ROTATING MEMBERS

CROSS-REFERENCE TO RELATED APPLICATIONS

This application is based on and claims priority under 35 USC 119 from Japanese Patent Application No. 2014-203874 filed Oct. 2, 2014.

BACKGROUND

Technical Field

The present invention relates to sheet processing apparatuses, image forming systems, and pairs of rotating members.

SUMMARY

According to an aspect of the invention, there is provided a sheet processing apparatus including a rotating member, a switching unit, and a pressing unit. The rotating member is rotatable and has a facing portion that faces a fold section of a sheet. The rotating member rotates so as to switch the facing portion to another facing portion. Each facing portion is provided with a protrusion. A set position of the protrusion in an axial direction varies from facing portion to facing portion. The switching unit rotates the rotating member so as to switch the facing portion that faces the fold section. The pressing unit presses the protrusion of the facing portion against the fold section.

BRIEF DESCRIPTION OF THE DRAWINGS

An exemplary embodiment of the present invention will be described in detail based on the following figures, wherein:

FIG. 5 is a developed view of the outer peripheral surface of a first pressing roller;

DETAILED DESCRIPTION

An exemplary embodiment of the present invention will be described below with reference to the appended drawings.

Image Forming System 100

Figure 1:
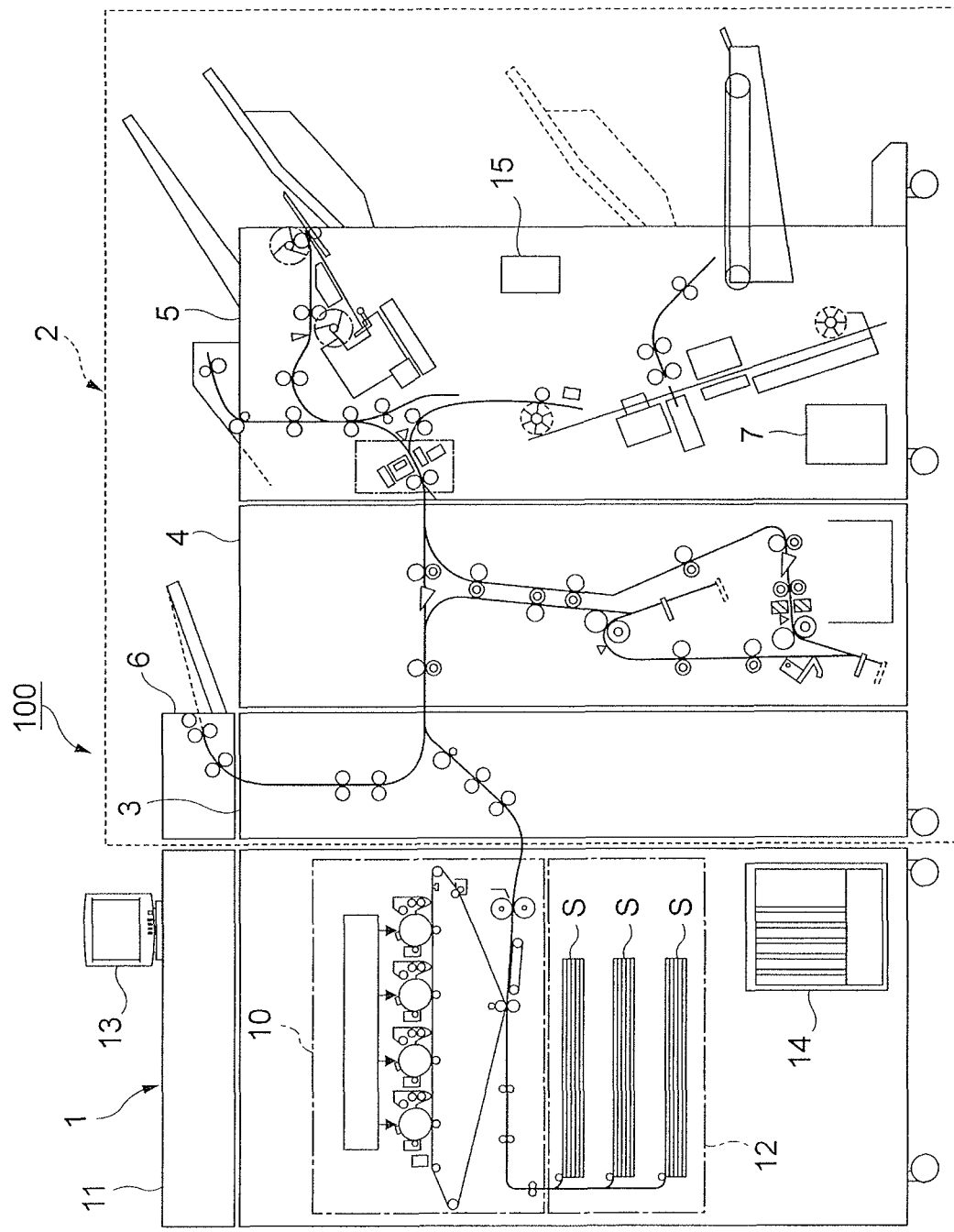
FIG. 1 illustrates the overall configuration of an image forming system according to an exemplary embodiment.

FIG. 1 illustrates the overall configuration of an image forming system 100 according to an exemplary embodiment. The image forming system 100 shown in FIG. 1 is provided with an image forming apparatus 1 that forms a color image by electrophotography, such as a printer or a copier, and a post-processing apparatus 2 that performs post-processing on a sheet S having an image formed thereon by the image forming apparatus 1.

The image forming apparatus 1 includes an image forming unit 10 that forms images based on image data of respective colors, an image reading unit 11 that reads an image from a document so as to generate read image data, a sheet feeding unit 12 that feeds a sheet S to the image forming unit 10, an overall user interface 13 that accepts an operation input from a user and presents information to the user, and a controller 14 that controls the overall operation of the image forming system 100.

The post-processing apparatus 2 is provided with a transport unit 3 that receives and transports a sheet S having an image formed thereon from the image forming apparatus 1, a folding unit 4 that performs a folding process on the sheet S transported from the transport unit 3, a finisher unit 5 that performs a finishing process on the sheet S that has passed through the folding unit 4, and an interposer 6 that feeds a slip sheet to be used as, for example, a cover of a booklet. Furthermore, the post-processing apparatus 2 is provided with a sheet processing controller 7 that controls each functional unit of the post-processing apparatus 2, and a user interface (UI) 15 that accepts a post-processing-related operation input from a user.

Although this exemplary embodiment shows a configuration example in which the sheet processing controller 7 is provided within the post-processing apparatus 2, the sheet processing controller 7 may alternatively be provided within the image forming apparatus 1. Moreover, the controller 14 may alternatively have the control function of the sheet processing controller 7.

Furthermore, although this exemplary embodiment shows a configuration example in which the user interface 15 is provided in the post-processing apparatus 2, the user interface 15 may alternatively be provided in the image forming apparatus 1. Moreover, the overall user interface 13 may have the function of the user interface 15.

Post-Processing Apparatus 2

Figure 2:
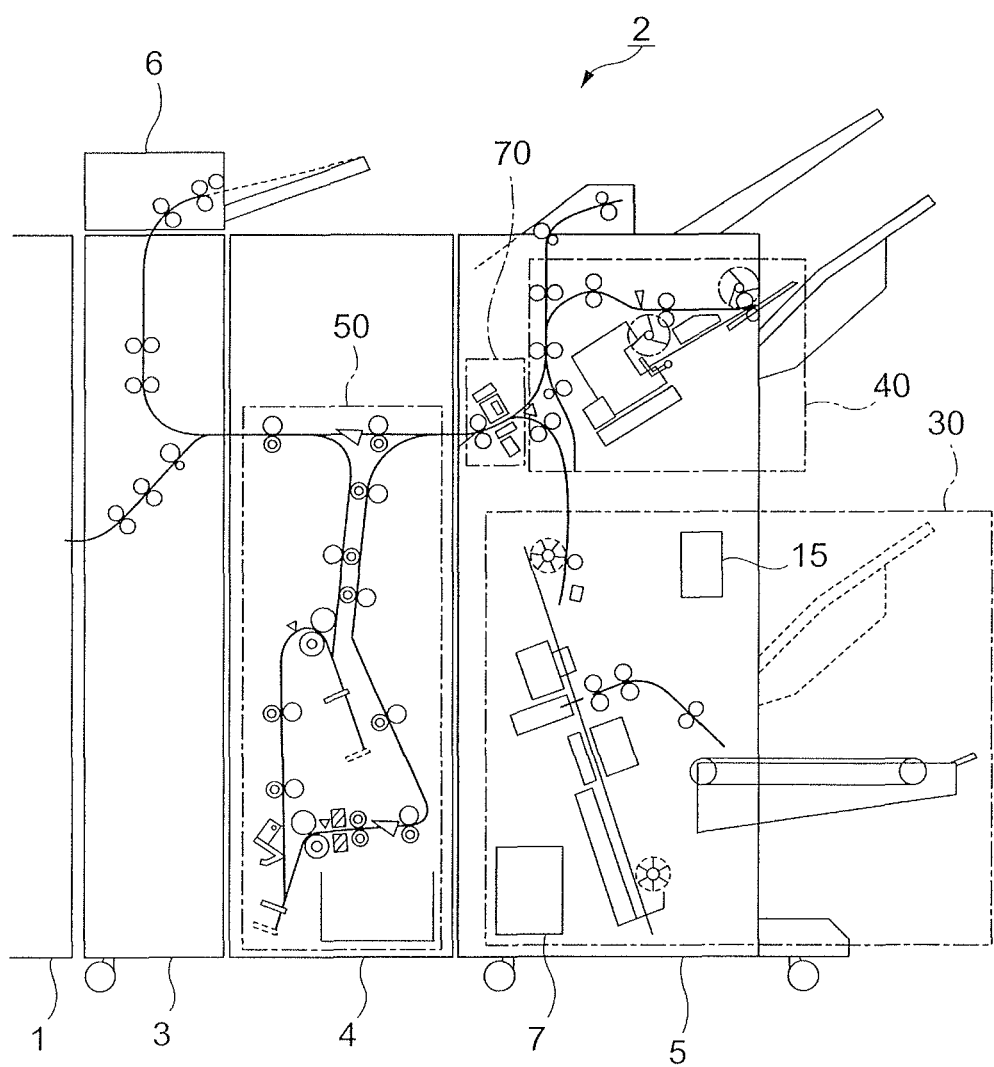
FIG. 2 illustrates a post-processing apparatus.

FIG. 2 illustrates the post-processing apparatus 2.

The post-processing apparatus 2 is provided with the finisher unit 5. The finisher unit 5 is provided with a punching functional unit 70 that performs a punching process on a sheet S so as to form, for example, two holes or four holes therein, and an edge-binding functional unit 40 that creates a sheet bundle by stacking a predetermined number of sheets S and that performs a staple-binding process (i.e., an edge-binding process) on an edge of this sheet bundle.

Furthermore, the post-processing apparatus 2 is also provided with a saddle-stitch book-binding functional unit 30 that creates a sheet bundle by stacking a predetermined number of sheets S and that creates a booklet (i.e., performs a book-binding process) by performing a binding process (i.e., a saddle-stitching process) on a midsection of this sheet bundle.

Moreover, the folding unit 4 of the post-processing apparatus 2 is provided with a folding functional unit 50 that performs a folding process, such as an inward threefold process (i.e., a C-fold process) or an outward threefold process (i.e., a Z-fold process), on a sheet S.

Saddle-Stitch Book-Binding Functional Unit 30

Figure 3:
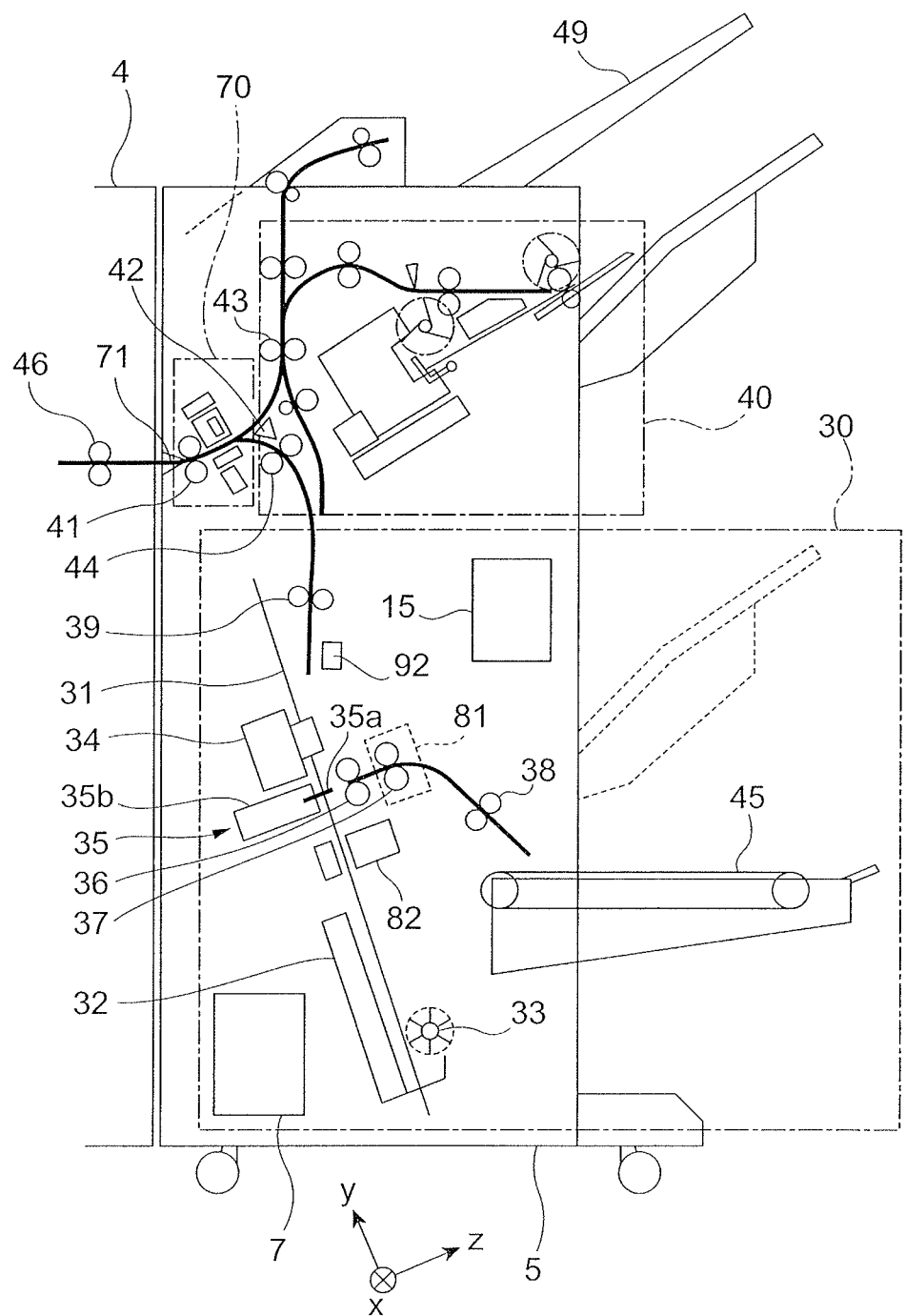
FIG. 3 illustrates the configuration of a saddle-stitch book-binding functional unit.

FIG. 3 illustrates the configuration of the saddle-stitch book-binding functional unit 30.

The saddle-stitch book-binding functional unit 30 is provided with a plate-shaped compiling member 31 that forms a sheet bundle by stacking a predetermined number of sheets S after an image forming process. The saddle-stitch book-binding functional unit 30 is also provided with a transport roller 39 that transports sheets S one-by-one to the compiling member 31. Moreover, the saddle-stitch book-binding functional unit 30 is provided with an end guide 32 that supports the sheet bundle on the compiling member 31 from below. This end guide 32 is movable along the compiling member 31.

Furthermore, the saddle-stitch book-binding functional unit 30 is provided with a sheet alignment paddle 33 that aligns the edges of the sheets S by biasing the sheets S stacked on the compiling member 31 toward the end guide 32, and a sheet-width alignment member 34 that aligns the sheets S in the width direction of the sheets S stacked on the compiling member 31. Moreover, the saddle-stitch book-binding functional unit 30 is provided with a stapler 82 that performs a binding process on the sheet bundle on the compiling member 31 by piercing a staple (not shown) therethrough.

Furthermore, the saddle-stitch book-binding functional unit 30 is provided with a folding-process mechanism 35 that performs a folding process on the sheet bundle that has undergone the binding process. This folding-process mechanism 35 is provided with a folder knife 35a. The folding-process mechanism 35 is also provided with an advancement mechanism 35b that is equipped with, for example, a motor and that causes the folder knife 35a to advance toward the load surface of the compiling member 31 (i.e., z-direction) from the back surface thereof.

The saddle-stitch book-binding functional unit 30 is also provided with a nipping roller 36 constituted of a pair of rollers that nip the sheet bundle for which the folding process by the folder knife 35a has commenced, and a pressing roller 37 constituted of a pair of rollers that press against a fold section of the sheet bundle that has passed through the nipping roller 36.

In this exemplary embodiment, a section where the pressing roller 37 and a driving mechanism 81 (which will be described later) that drives the pressing roller 37 are provided may be regarded as a sheet processing apparatus that performs a pressing process on the fold section.

Furthermore, in this exemplary embodiment, an output roller 38 that outputs the sheet bundle that has been book-bound into a booklet and a booklet load section 45 onto which the sheet bundle transported by the output roller 38 is loaded are provided downstream of the pressing roller 37.

Moreover, the driving mechanism 81 that drives the pressing roller 37 and a sheet sensor 92 that detects each sheet S transported to the compiling member 31 by the transport roller 39 are also provided.

In FIG. 3, a direction in which the sheets S are transported along the load surface of the compiling member 31 is defined as a y-direction, a direction (i.e., width direction of the sheets S) orthogonal to the transport direction of the sheets S is defined as an x-direction, and a direction orthogonal to the load surface of the compiling member 31 is defined as a z-direction.

Configuration of Folding-Process Mechanism 35 and Vicinity Thereof

Figure 4:
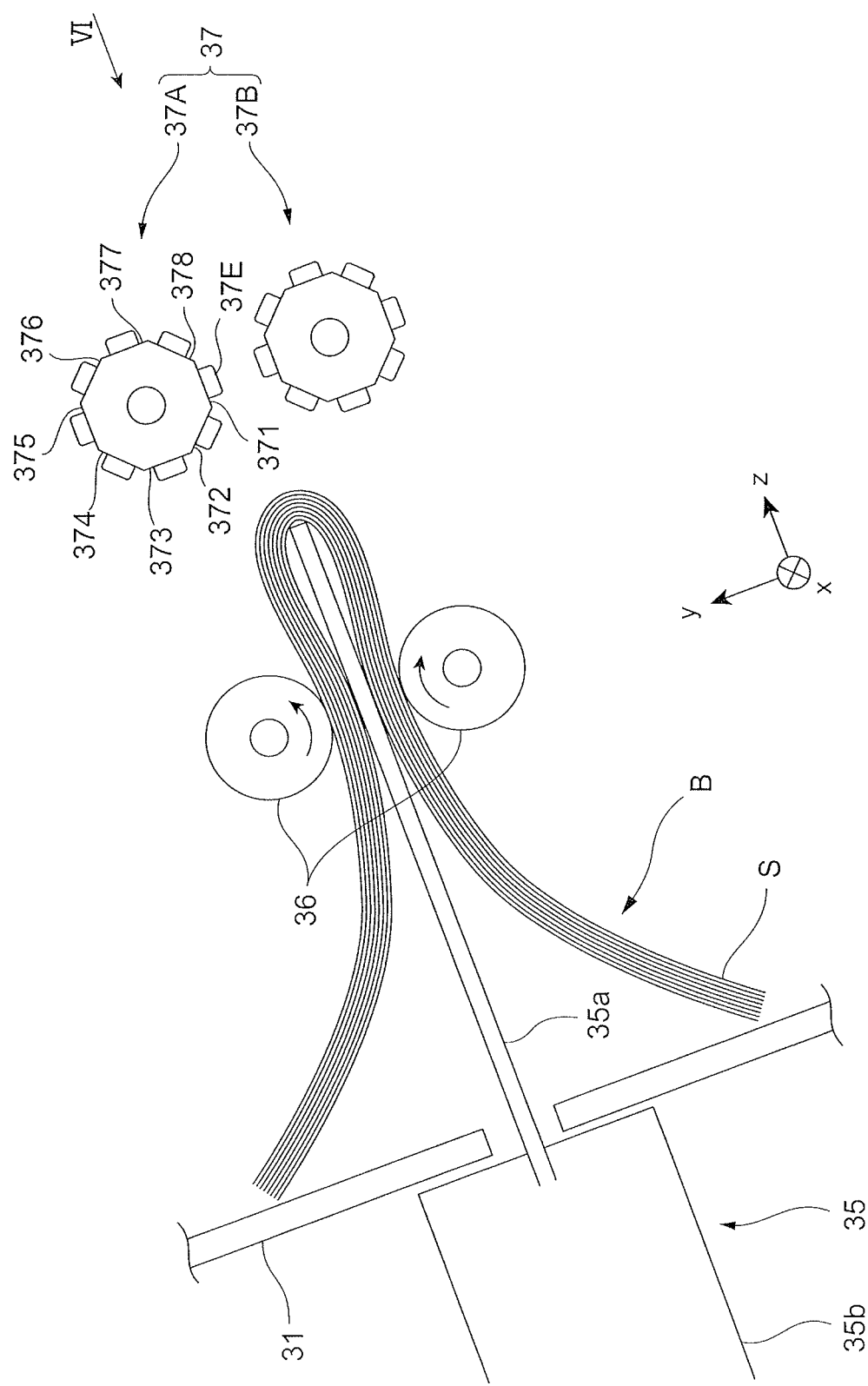
FIG. 4 illustrates the configuration of a folding-process mechanism and its vicinity.

FIG. 4 illustrates the configuration of the folding-process mechanism 35 and its vicinity.

As described above, in this exemplary embodiment, the folding-process mechanism 35 that performs a folding process on a sheet bundle B that has undergone a binding process is provided. This folding-process mechanism 35 is provided with the folder knife 35a and the advancement mechanism 35b that causes the folder knife 35a to advance toward the sheet bundle B.

In this exemplary embodiment, the folder knife 35a advances until an edge of the folder knife 35a reaches the nipping roller 36. Thus, a fold line is formed in the sheet bundle B, and this fold line (fold section) is pressed from opposite sides by the nipping roller 36.

In the sheet stacking stage on the compiling member 31, the saddle-stitching stage by the stapler 82 (see FIG. 3), or the sheet transport stage after the saddle-stitching process, the folder knife 35a is located behind the compiling member 31. Thus, interference between the sheets S and the folder knife 35a may be prevented.

Furthermore, in this exemplary embodiment, the pressing roller 37 constituted of a pair of rollers that press against the fold section of the sheet bundle B is provided downstream of the nipping roller 36.

The pressing roller 37 as an example of a pair of rotating members includes a first pressing roller 37A extending in a direction orthogonal to the plane of the drawing and a second pressing roller 37B similarly extending in the direction orthogonal to the plane of the drawing.

The first pressing roller 37A as an example of a rotating member has an octagonal cross-sectional shape. Furthermore, the first pressing roller 37A has a facing surface (facing portion) 371 that faces the fold section of the sheet bundle B. Moreover, in this exemplary embodiment, the facing surface 371 is provided with a protrusion 37E.

Furthermore, in this exemplary embodiment, the first pressing roller 37A is rotatable counterclockwise in FIG. 4 and switches the facing surface 371 by rotating. In other words, in this exemplary embodiment, due to having an octagonal cross-sectional shape, the first pressing roller 37A has eight facing surfaces 371 to 378 (which will be referred to as "first facing surface 371 to eight facing surface 378" hereinafter), and each of these facing surfaces is provided with a protrusion 37E.

In this exemplary embodiment, the second pressing roller 37B has a configuration similar to that of the first pressing roller 37A. Similar to the first pressing roller 37A, the second pressing roller 37B has an octagonal cross-sectional shape and has eight facing surfaces (first facing surface 371 to eight facing surface 378). Moreover, each of these eight facing surfaces is provided with a protrusion 37E.

Unlike the first pressing roller 37A, the second pressing roller 37B rotates clockwise in FIG. 4. Moreover, the second pressing roller 37B is disposed parallel to the first pressing roller 37A. In other words, the second pressing roller 37B rotates about a rotation axis extending in the axial direction of the first pressing roller 37A and rotates in the reverse direction relative to the first pressing roller 37A.

The second pressing roller 37B may be regarded as an opposite member that is positioned opposite the first pressing roller 37A with the fold section of the sheet bundle B interposed therebetween when the pressing process is to be performed on the fold section.

First Pressing Roller 37A

FIG. 5 is a developed view of the outer peripheral surface of the first pressing roller 37A.

As described above, in this exemplary embodiment, the first facing surface 371 to the eighth facing surface 378 are provided. In the developed view shown in FIG. 5, the first facing surface 371 to the eighth facing surface 378 are arranged from top to bottom. Moreover, as described above, each of the first facing surface 371 to the eighth facing surface 378 is provided with a protrusion 37E.

Although not described above, each of the first facing surface 371 to the eighth facing surface 378 is provided with multiple protrusions 37E. Moreover, in this exemplary embodiment, the set positions of the protrusions 37E vary from facing surface to facing surface. In other words, the set positions of the protrusions 37E in the axial direction of the first pressing roller 37A vary from facing surface to facing surface. More specifically, in this exemplary embodiment, the protrusions 37E are disposed more leftward in FIG. 5 as the facing surfaces are located more downward in FIG. 5.

Fold-Section Pressing Process

FIGS. 6A to 6D and FIGS. 7A and 7B illustrate the pressing process performed on the fold section by the pressing roller 37. FIGS. 6A to 6D and FIGS. 7A and 7B each illustrate a state where the pressing roller 37 and the sheet bundle B are viewed along an arrow VI in FIG. 4.

Figure 6A:
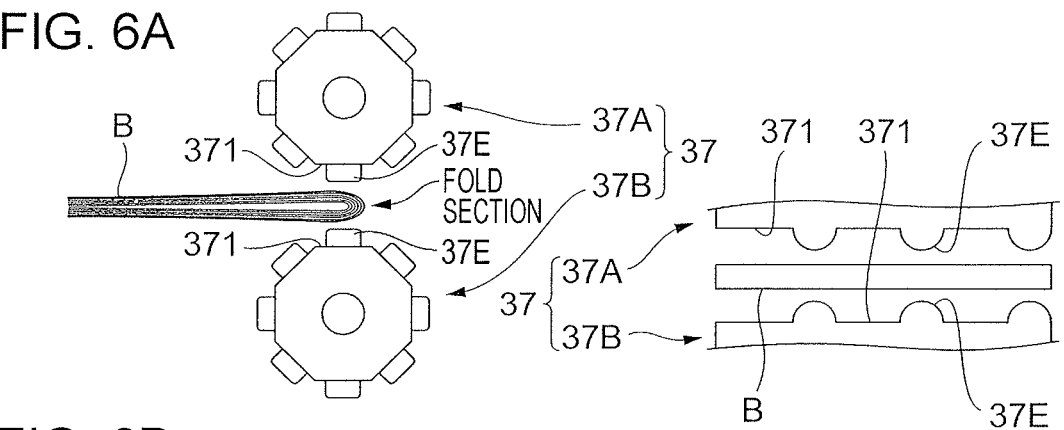
FIGS. 6A to 6D illustrate a pressing process performed on a fold section by a pressing roller.

In this exemplary embodiment, the nipping roller 36 (see FIG. 3) transports the sheet bundle B to the pressing roller 37. When the fold section of the sheet bundle B reaches the pressing roller 37, the nipping roller 36 temporarily stops transporting the sheet bundle B. At this time, as shown in FIG. 6A, the first pressing roller 37A and the second pressing roller 37B of the pressing roller 37 are disposed away from each other.

Figure 6B:
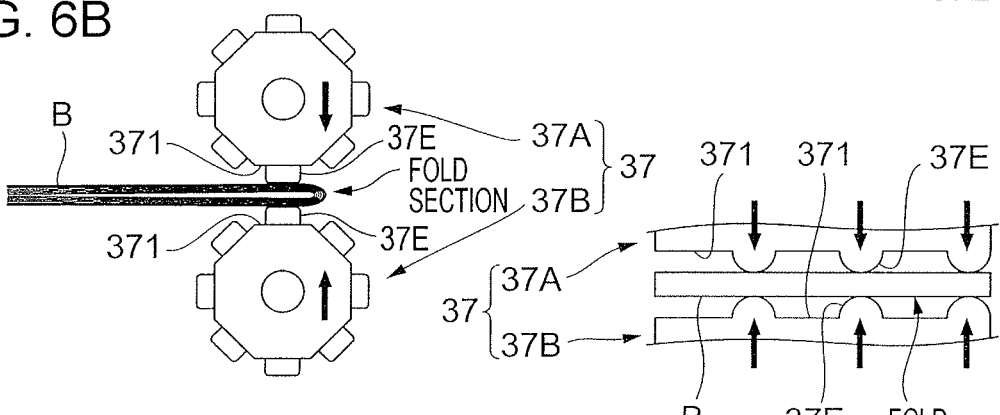

Subsequently, as shown in FIG. 6B, in this exemplary embodiment, the first pressing roller 37A and the second pressing roller 37B advance toward the fold section, so that the fold section becomes pressed by the first pressing roller 37A and the second pressing roller 37B. More specifically, the protrusions 37E as an example of first protrusions provided on the first facing surface 371 of the first pressing roller 37A and the protrusions 37E provided as second protrusions on the first facing surface 371 of the second pressing roller 37B nip the fold section, so that the fold section becomes pressed by these two groups of protrusions 37E. Thus, bulging of the sheet bundle B at the fold section thereof is reduced.

Figure 6C:
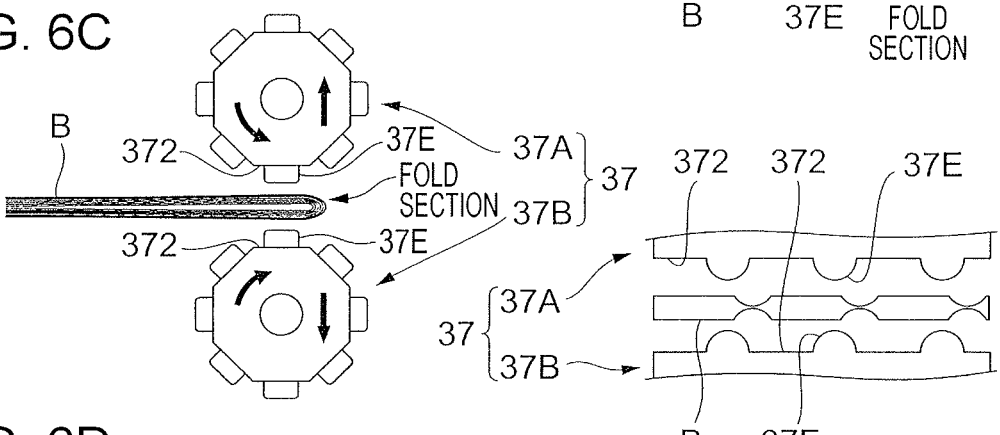

Subsequently, as shown in FIG. 6C, in this exemplary embodiment, the first pressing roller 37A and the second pressing roller 37B recede from the fold section. Moreover, the first pressing roller 37A and the second pressing roller 37B each makes a ⅛ rotation. Thus, the second facing surfaces 372 of the first pressing roller 37A and the second pressing roller 37B face the fold section.

Figure 6D:
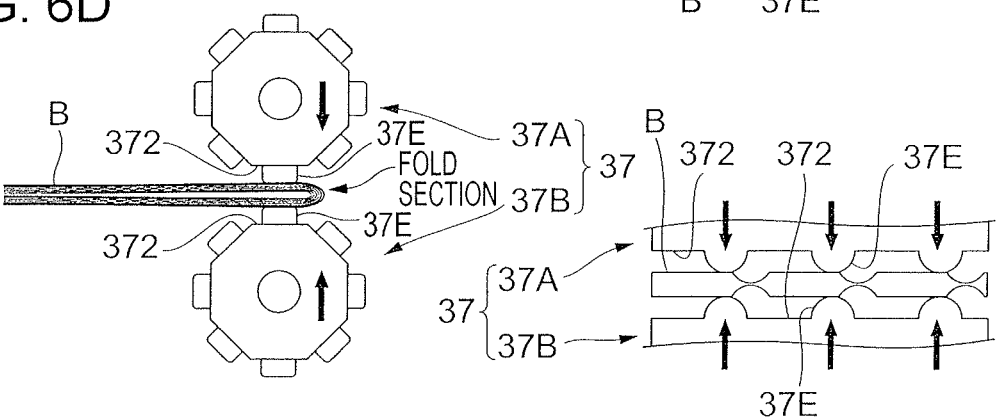

Subsequently, as shown in FIG. 6D, the first pressing roller 37A and the second pressing roller 37B press against the fold section again. More specifically, the protrusions 37E provided on the second facing surface 372 of the first pressing roller 37A and the protrusions 37E provided on the second facing surface 372 of the second pressing roller 37B press against the fold section.

In this exemplary embodiment, since the protrusions 37E provided on each second facing surface 372 and the protrusions 37E provided on each first facing surface 371 are displaced relative to each other in the axial direction of the pressing roller 37, as shown in FIG. 5, the positions of the fold section pressed by the second facing surfaces 372 are different from the positions of the fold section pressed by the first facing surfaces 371.

Subsequently, in this exemplary embodiment, the above-described steps are repeated. Specifically, the pressing step by the protrusions 37E, the receding step of the first pressing roller 37A and the second pressing roller 37B from the fold section, the rotating step of the first pressing roller 37A and the second pressing roller 37B, and the advancing step of the first pressing roller 37A and the second pressing roller 37B toward the fold section are repeated.

Figure 7A:
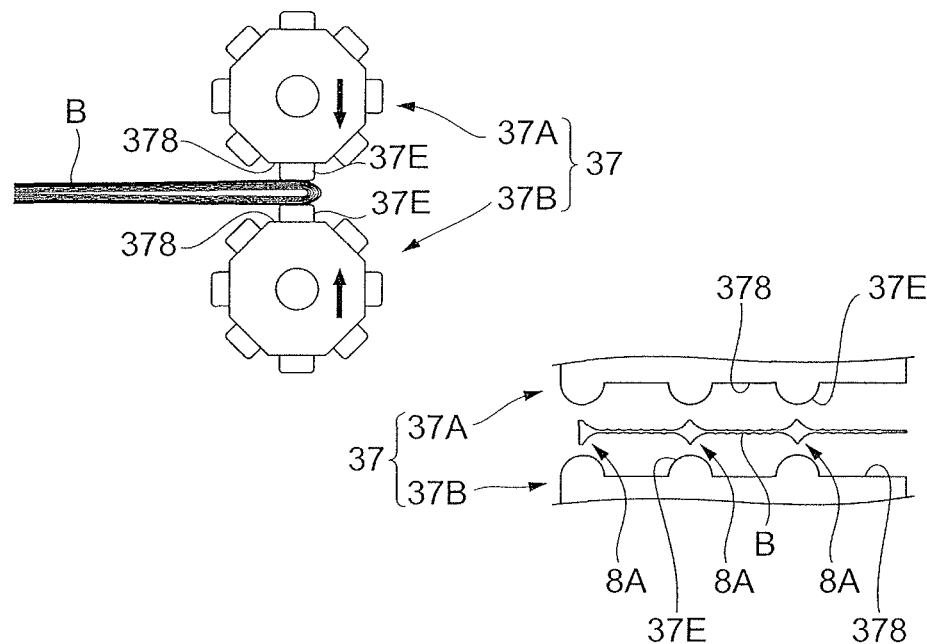
FIGS. 7A and 7B illustrate the pressing process performed on the fold section by the pressing roller.

FIG. 7A illustrates a final stage of the pressing process performed by the first pressing roller 37A and the second pressing roller 37B. Specifically, FIG. 7A illustrates a state where the fold section is being pressed by the eighth facing surfaces 378.

In the pressing step by (the protrusions 37E provided on) the eighth facing surfaces 378, portions denoted by reference character 8A in FIG. 7A are pressed, so that the pressing process is performed entirely on the fold section in the longitudinal direction thereof.

Figure 7B:
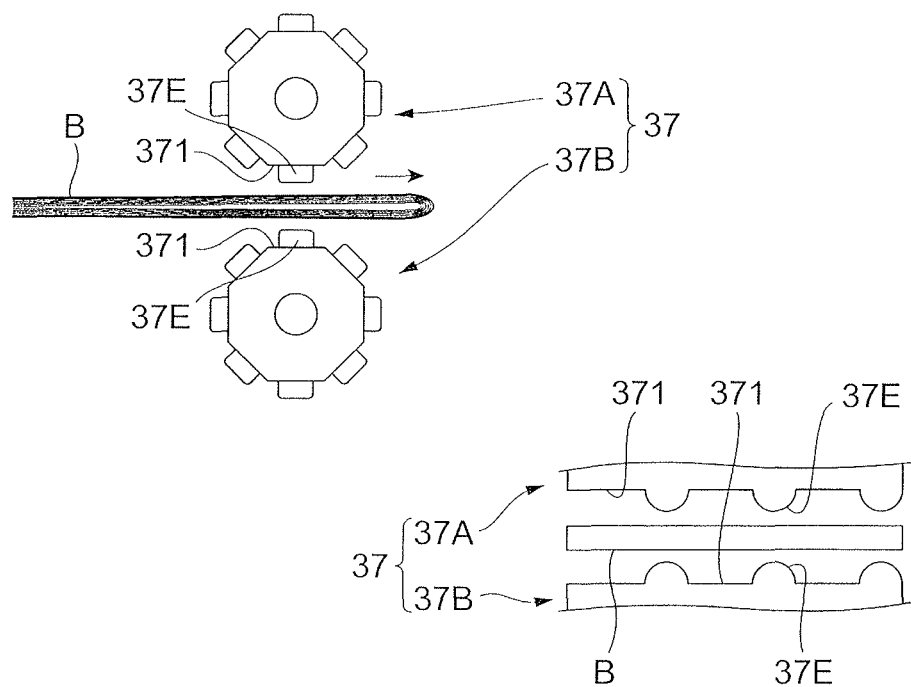

Subsequently, as shown in FIG. 7B, in this exemplary embodiment, the first pressing roller 37A and the second pressing roller 37B recede from the fold section. Moreover, the first pressing roller 37A and the second pressing roller 37B rotate so that the first facing surfaces 371 thereof face each other. Thus, the pressing process becomes executable on a subsequent new sheet bundle B.

Subsequently, in this exemplary embodiment, the nipping roller 36 (see FIG. 4) rotates so as to move the current sheet bundle B downstream, as shown in FIG. 7B. Then, the sheet bundle B reaches the output roller 38 (see FIG. 3) and is transported to the booklet load section 45.

In the configuration according to this exemplary embodiment, bulging of the sheet bundle B may be suppressed while an increase in size of the apparatus may be suppressed. Such bulging of the sheet bundle B may be suppressed also by, for example, using the outer peripheral surfaces of cylindrical roller members to nip the fold section from opposite sides of the sheet bundle B. In this case, since the fold section becomes pressed by a wide area in the longitudinal direction of the roller members (i.e., since the pressing area increases due to the fold section being pressed by planar portions), the pressing load per unit area tends to decrease.

In order to suppress a decrease in this pressing load, for example, the spring load applied for pressing has to be increased. In this case, the strength of, for example, a frame is increased. This tends to lead to an increase in size of the apparatus.

In contrast, in the configuration according to this exemplary embodiment, the sheet bundle B is pressed by using the protrusions 37E, so that the pressing load may be concentrated on specific locations of the fold section, whereby the fold section may be pressed even with small spring load. In this case, the aforementioned frame with increased strength may be omitted.

Furthermore, in the configuration according to this exemplary embodiment, bulging of the sheet bundle B may be suppressed while the occurrence of fold wrinkles at the fold section of the sheet bundle B may be suppressed. Such bulging of the sheet bundle B may be suppressed also by, for example, nipping the fold section using a fold-enhancing roller that further applies pressure onto the fold section. In this case, the fold-enhancing roller moves along the fold section while pressing against an extremely narrow area of the fold section and concentrating on a single location thereof so as to rapidly and firmly press down on the fold section. This tends to cause fold wrinkles to occur at the fold section of the sheet bundle B.

In order to suppress this occurrence of fold wrinkles, for example, deformation of the sheet bundle B has to be reduced at the time of the pressing process. In this case, for example, the spring load applied for pressing has to be reduced. This tends to lower the effect of suppressing bulging of the sheet bundle B.

In contrast, in the configuration according to this exemplary embodiment, since bulging of the sheet bundle B is suppressed to some extent by applying load thereto from directly above even at locations other than the protrusions 37E, the occurrence of fold wrinkles at the fold section may be suppressed even by concentrating the pressing load to specific locations of the fold section. In this case, the load may be increased up to the limit of the strength of the frame and the rollers.

In the configuration as in this exemplary embodiment in which the protrusions 37E located at different positions advance toward the fold section, it is conceivable to prepare multiple members individually having the protrusions 37E and to make these members sequentially advance toward the fold section. In this case, a mechanism for sequentially switching between these members has to be provided, which may lead to a complicated and large-sized apparatus.

In contrast, in the configuration according to this exemplary embodiment, the protrusions 37E located at different positions are made to advance toward the fold section by simply rotating the pressing roller 37 and moving the pressing roller 37 toward the fold section. Thus, the number of components may be reduced, as compared with the above-described case where the multiple members are made to sequentially advance toward the fold section. In addition, complexity of the apparatus may be suppressed, and the apparatus may be reduced in size, as compared with the case where the multiple members are made to sequentially advance toward the fold section.

Figure 8:
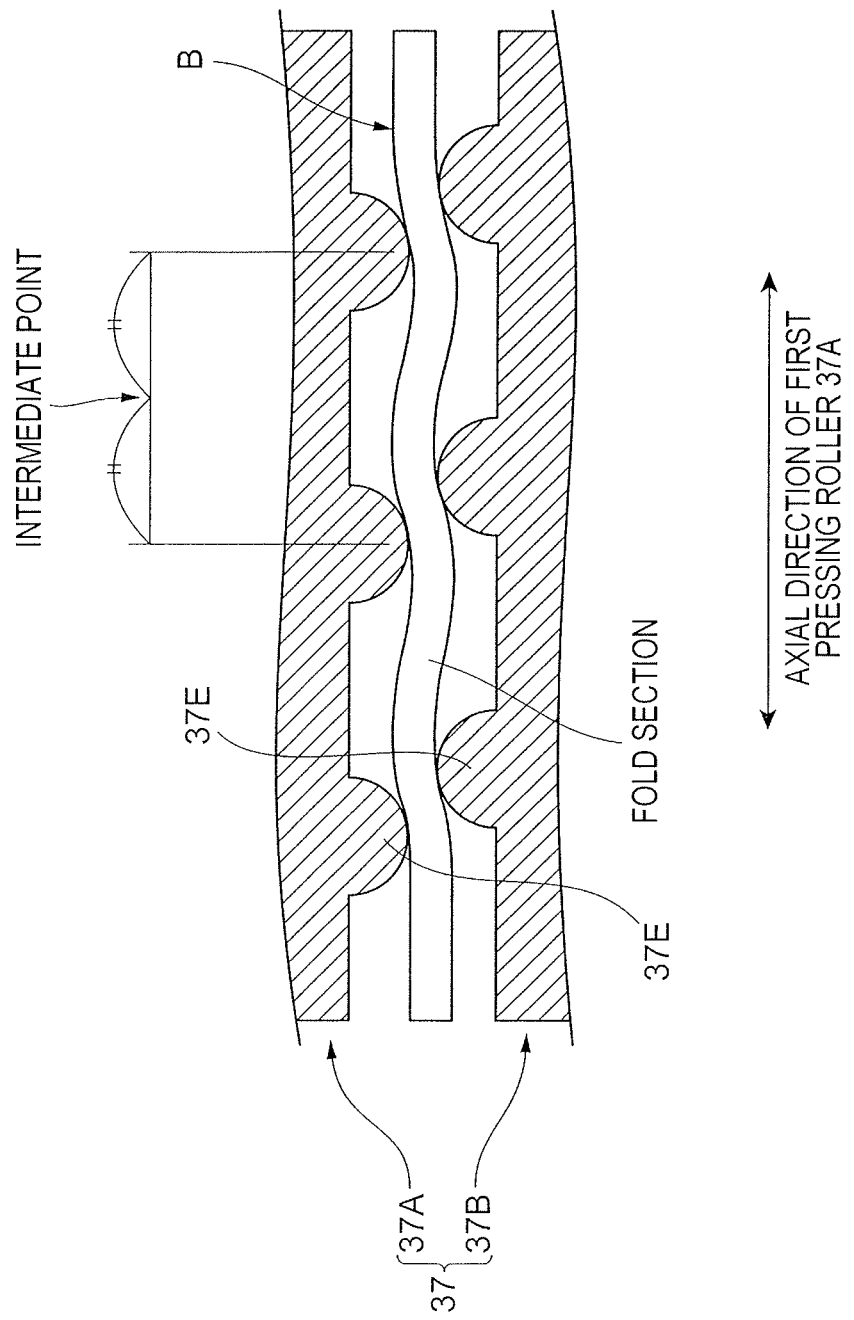
FIG. 8 illustrates another configuration example of the pressing roller.

FIG. 8 illustrates another configuration example of the pressing roller 37.

In this configuration example, the positions of the protrusions 37E of the first pressing roller 37A and the positions of the protrusions 37E of the second pressing roller 37B are displaced relative to each other in the axial direction of the pressing roller 37.

In other words, in this configuration example, the pressing positions where the protrusions 37E provided on the first pressing roller 37A press against the fold section and the pressing positions where the protrusions 37E provided on the second pressing roller 37B press against the fold section are displaced relative to each other in the axial direction of the pressing roller 37. In this case, the fold section becomes firmly pressed, so that the sheet bundle B becomes less likely to bulge again upon completion of the pressing process, as compared with the above configuration in which the fold section is pressed by the two opposing groups of protrusions 37E.

More specifically, in the configuration shown in FIG. 8, each protrusion 37E of the second pressing roller 37B advances toward a space located between two protrusions 37E, which are adjacent to each other in the axial direction of the first pressing roller 37A, of the multiple protrusions 37E provided on the first pressing roller 37A. Moreover, in this configuration example, each protrusion 37E of the second pressing roller 37B is positioned leftward (i.e., toward one of the aforementioned two adjacent protrusions 37E) relative to an intermediate point between the aforementioned two adjacent protrusions 37E.

Although each protrusion 37E of the second pressing roller 37B is positioned leftward relative to the intermediate point in FIG. 8, if the aforementioned two protrusions 37E are separated from each other by a small distance, a configuration in which each protrusion 37E of the second pressing roller 37B advances toward the intermediate point between these two protrusions 37E is also conceivable.

Figure 9:
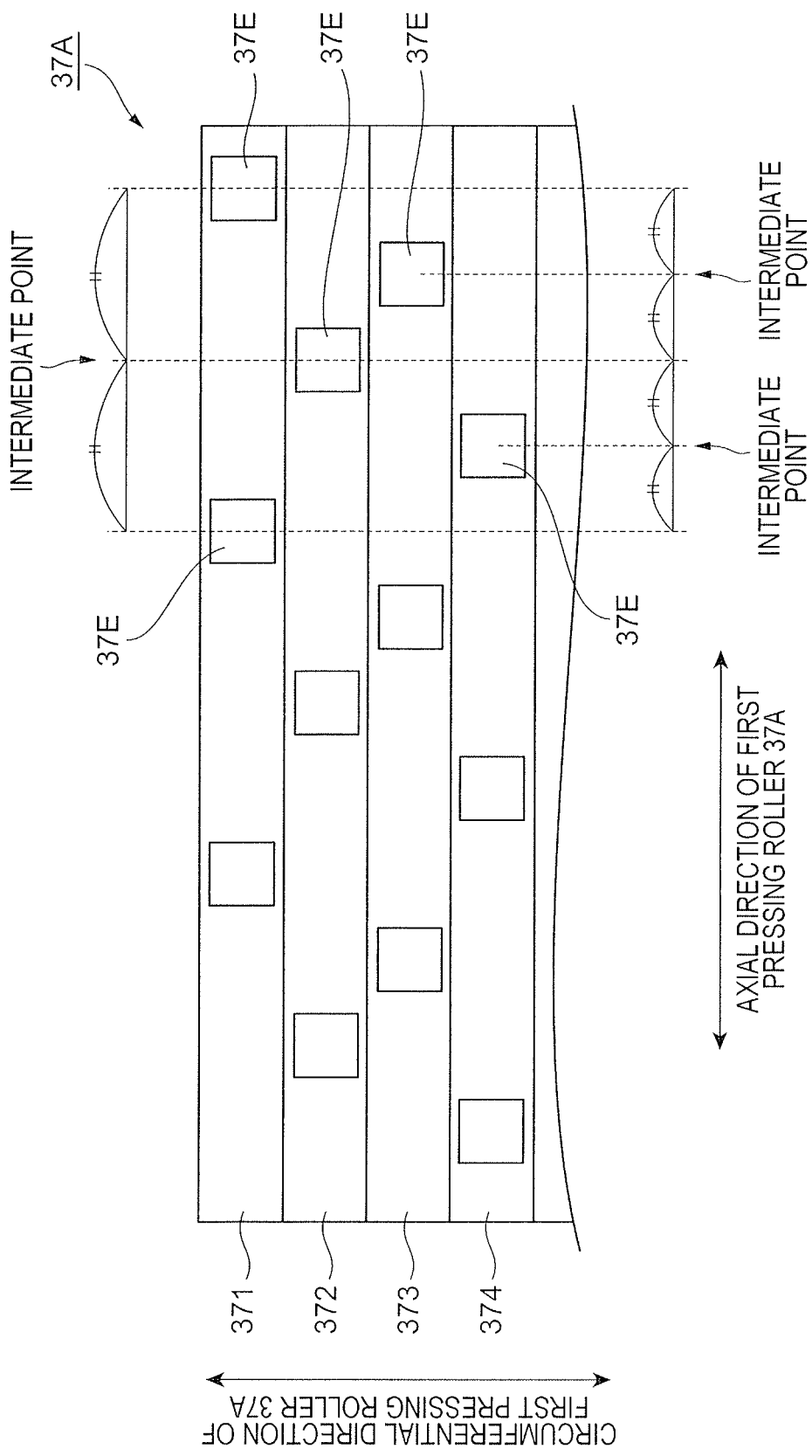
FIG. 9 illustrates another configuration example of the first pressing roller.

FIG. 9 illustrates another configuration example of the first pressing roller 37A. Similar to FIG. 5, FIG. 9 is a developed view of the outer peripheral surface of the first pressing roller 37A.

In this exemplary embodiment, multiple pressed locations occur in the fold section every time the protrusions 37E provided on the respective facing surfaces press against the fold section. In the configuration according to this exemplary embodiment, when a new pressing step is to be performed by using the protrusions 37E, the intermediate points between the pressed locations that have occurred in the previous pressing step may be pressed.

More specifically, in the configuration example shown in FIG. 9, each protrusion 37E on the second facing surface 372 is provided at an intermediate point between two adjacent protrusions 37E provided on the first facing surface 371. Thus, when a pressing step is to be performed by using the protrusions 37E provided on the second facing surface 372, the intermediate points between the pressed locations that have occurred in the previous pressing step by the first facing surface 371 are pressed by the protrusions 37E on the second facing surface 372.

The same applies to the other facing surfaces. Specifically, each protrusion 37E provided on the third facing surface 373 is provided at an intermediate point between one protrusion 37E provided on the first facing surface 371 and one protrusion 37E provided on the second facing surface 372. Thus, in a pressing step by the third facing surface 373, the intermediate points between the pressed locations that have occurred in the pressing step by the first facing surface 371 and the pressed locations that have occurred in the pressing step by the second facing surface 372 are pressed by the protrusions 37E on the third facing surface 373.

Furthermore, each protrusion 37E provided on the fourth facing surface 374 is similarly provided at an intermediate point between one protrusion 37E provided on the first facing surface 371 and one protrusion 37E provided on the second facing surface 372. Thus, in a pressing step by the fourth facing surface 374, the intermediate points between the pressed locations that have occurred in the pressing step by the first facing surface 371 and the pressed locations that have occurred in the pressing step by the second facing surface 372 are pressed by the protrusions 37E on the fourth facing surface 374.

Subsequently, pressing steps are sequentially performed by the fifth facing surface 375 to the eighth facing surface 378. In each of these pressing steps, intermediate points between pressed locations that have occurred in the previous pressing step are pressed.

The second pressing roller 37B has a configuration similar to that of the first pressing roller 37A. In the pressing process by the second pressing roller 37B, intermediate points between pressed locations that have occurred in the previous pressing step are similarly pressed.

Figure 10:
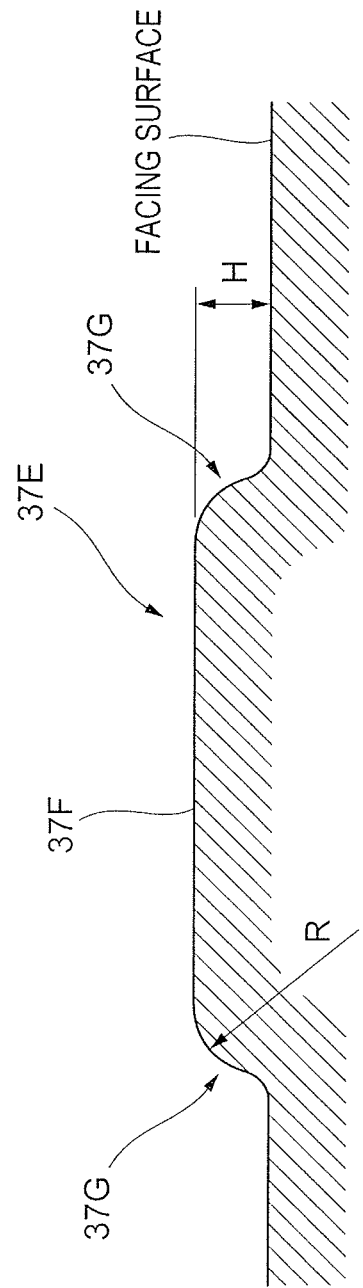
FIG. 10 illustrates another configuration example of each protrusion provided on the first pressing roller and the second pressing roller.

FIG. 10 illustrates another configuration example of each protrusion 37E provided on the first pressing roller 37A and the second pressing roller 37B.

In the above description, dome-shaped protrusions 37E each having curvature in its entirety have been described as an example. Alternatively, each protrusion 37E may be formed as shown in FIG. 10.

The protrusion 37E shown in FIG. 10 is provided with a flat surface 37F, which is parallel to the facing surface (i.e., the corresponding one of the first facing surface 371 to the eighth facing surface 378), at the top of the protrusion 37E.

Moreover, the protrusion 37E is provided with side portions 37G, and each of these side portions 37G is given curvature such that the side portion 37G bulges outward.

Although the above description relates to a configuration example in which multiple protrusions 37E are provided on each of the first facing surface 371 to the eighth facing surface 378, only a single protrusion 37E may be provided on each of the first facing surface 371 to the eighth facing surface 378.

Furthermore, although the first pressing roller 37A and the second pressing roller 37B each have a polygonal cross-sectional shape as an example, the first pressing roller 37A and the second pressing roller 37B may alternatively be cylindrical or columnar. In this case, each of the first pressing roller 37A and the second pressing roller 37B has multiple strip-shaped regions extending in the axial direction thereof and arranged in the circumferential direction thereof. Each of these strip-shaped regions serves as one facing surface and is provided with a protrusion or protrusions 37E.

If the first pressing roller 37A and the second pressing roller 37B each have a polygonal cross-sectional shape, the cross-sectional shape is not limited to an octagonal shape and may be another polygonal shape, such as a tetragonal shape.

Although the above description relates to a configuration that causes both the first pressing roller 37A and the second pressing roller 37B to advance toward and recede from the fold section, only one of the first pressing roller 37A and the second pressing roller 37B may be made to advance toward or recede from the fold section.

Furthermore, although the first pressing roller 37A and the second pressing roller 37B are rotated every time the fold section is pressed once by the first pressing roller 37A and the second pressing roller 37B in the above description, the first pressing roller 37A and the second pressing roller 37B may be rotated after pressing against the fold section multiple times with one pair of facing surfaces.

Furthermore, although the facing surfaces are sequentially made to face the fold section, starting from the first facing surfaces 371 and ending with the eighth facing surfaces 378 in the above description, the facing surfaces may be made to face the fold section in a different order. In this case, the above-described pressing process may be performed on the intermediate points by using the pressing roller 37 shown in FIG. 5. Specifically, the above-described pressing process may be performed on the intermediate points by making the facing surfaces face the fold section in the following order: the first facing surfaces 371, the fifth facing surfaces 375, the third facing surfaces 373, the seventh facing surfaces 377, and so on.

Furthermore, although both the first pressing roller 37A and the second pressing roller 37B are roller members in the above description, for example, the first pressing roller 37A alone may be provided, and a support base that supports the sheet bundle B from below may be provided at the second pressing roller 37B side.

Moreover, although the above description relates to an example of a configuration in which the pressing roller 37 advances toward the fold section, for example, the fold section may be pressed by the protrusions 37E by moving the sheet bundle B upward (e.g., by lifting the sheet bundle B from below by using, for example, the aforementioned support base).

Furthermore, in the above description, the protrusions 37E provided on the first facing surface 371 to the eighth facing surface 378 of each of the first pressing roller 37A and the second pressing roller 37B are displaced relative to one another in the axial direction of the pressing roller 37, and there are no facing surfaces with protrusions 37E disposed at identical positions in the axial direction. Alternatively, multiple facing surfaces with protrusions 37E disposed at identical positions in the axial direction may be provided.

Moreover, one or some of the multiple protrusions 37E provided on the first facing surface 371 to the eighth facing surface 378 of each of the first pressing roller 37A and the second pressing roller 37B may be positionally aligned in the axial direction. In this case, the same location of the fold section becomes pressed two or more times, so that, for example, a location where pressing is desirably performed thereon in particular may be pressed two or more times.

Driving Mechanism for Pressing Roller 37

Figure 11:
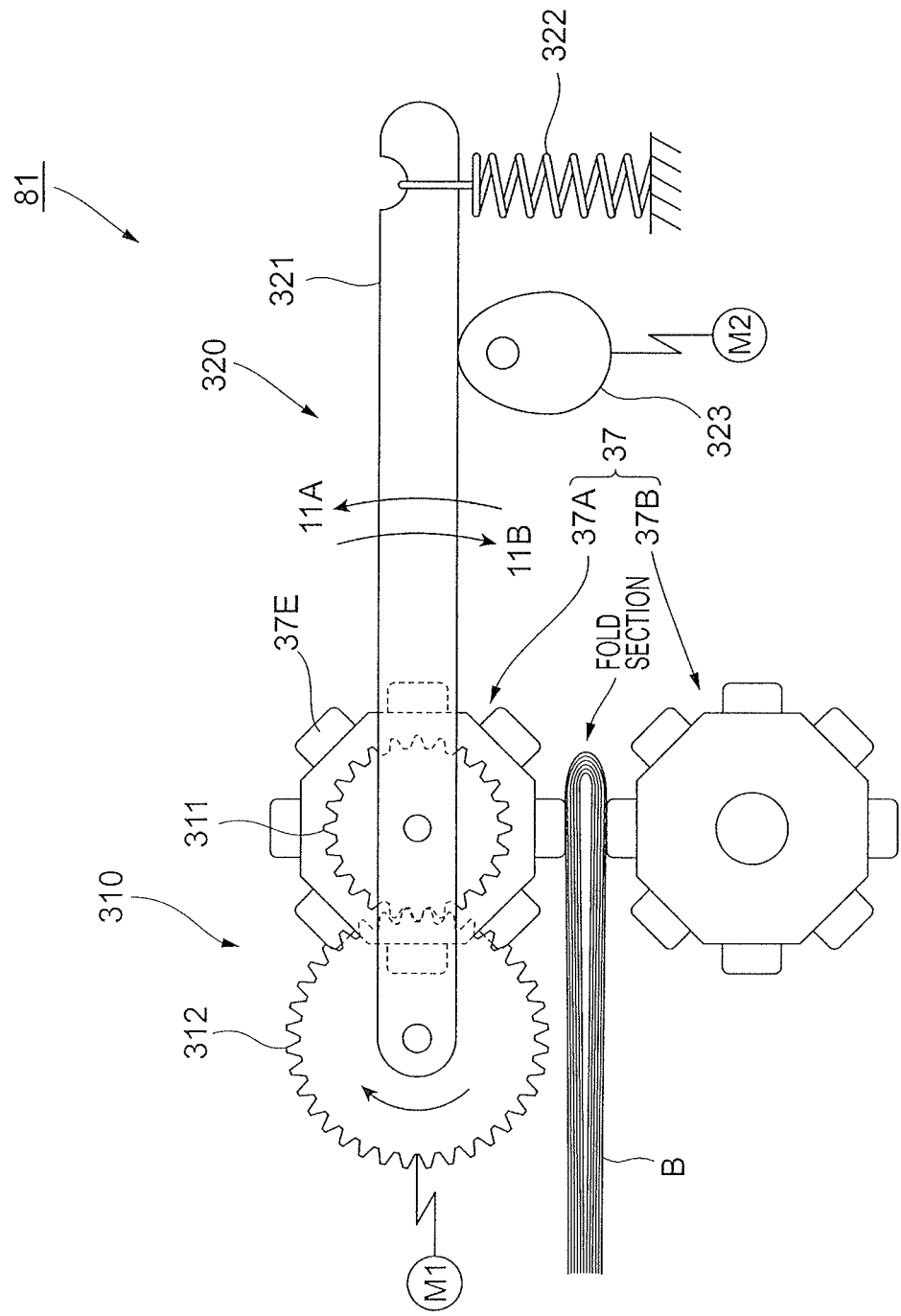
FIG. 11 illustrates a driving mechanism for the pressing roller.

FIG. 11 illustrates the driving mechanism 81 for the pressing roller 37.

As shown in FIG. 11, the driving mechanism 81 for the pressing roller 37 is provided with a rotating mechanism 310 that rotates the first pressing roller 37A. The rotating mechanism 310 functions as a switching unit that switches the facing surface that faces the fold section. In this exemplary embodiment, the first pressing roller 37A is rotated by the rotating mechanism 310 so that one facing surface is switched to another facing surface. Moreover, in this exemplary embodiment, an advance-recede mechanism 320 that causes the first pressing roller 37A to advance toward and recede from the fold section is provided.

Although not shown, a similar rotating mechanism 310 and a similar advance-recede mechanism 320 are provided also at the second pressing roller 37B side.

The rotating mechanism 310 is provided with a driving gear 312 that meshes with a roller gear 311 attached to an axial end of the first pressing roller 37A, and a first motor M1 that rotates the driving gear 312. In this exemplary embodiment, when the first motor M1 rotates, the driving gear 312 and the roller gear 311 are rotated accordingly, thereby rotating the first pressing roller 37A.

In this exemplary embodiment, the phase (state) of the first pressing roller 37A is detected by using an encoder (not shown). Alternatively, the phase of the first pressing roller 37A may be controlled by using a stepping motor.

The advance-recede mechanism 320 is provided with a lever member 321 that rotates about the rotation axis of the driving gear 312, a coil spring 322 that biases the lever member 321 toward the sheet bundle B, a cam 323 disposed at the sheet bundle B side relative to the lever member 321, and a second motor M2 that rotates the cam 323. Moreover, in this exemplary embodiment, the first pressing roller 37A is fixed to the lever member 321.

In this exemplary embodiment, the cam 323 is rotated by the second motor M2. Thus, the lever member 321 rotates in a direction indicated by an arrow 11A about the rotation axis of the driving gear 312, thereby causing the first pressing roller 37A to move toward and away from the fold section of the sheet bundle B.

When the cam 323 is rotated from the state where the first pressing roller 37A has receded from the fold section, the lever member 321 rotates in a direction indicated by an arrow 11B, thereby pressing (the protrusions 37E of) the first pressing roller 37A against the fold section. The advance-recede mechanism 320 may be regarded as a pressing unit that presses the protrusions 37E of the first pressing roller 37A against the fold section.

In this exemplary embodiment, since the first pressing roller 37A moves about the rotation axis of the driving gear 312, the meshed state between the driving gear 312 and the roller gear 311 is maintained in either one of the state where the first pressing roller 37A has receded from the fold section and the state where the first pressing roller 37A is pressed against the fold section.

Figure 12:
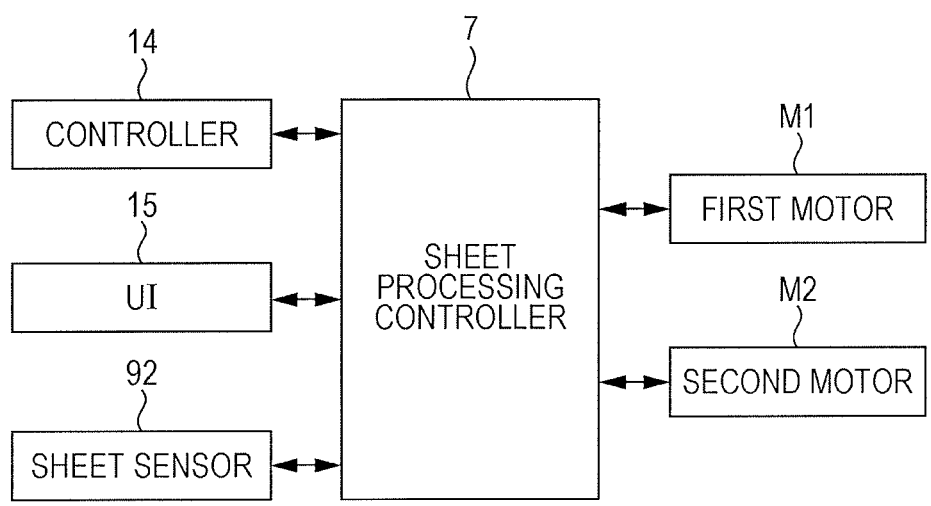
FIG. 12 is a functional block diagram of a sheet processing controller.

FIG. 12 is a functional block diagram of the sheet processing controller 7.

The sheet processing controller 7 according to this exemplary embodiment receives information about a process (i.e., a folding process) to be performed on a sheet bundle B from the controller 14 of the image forming apparatus 1. Moreover, the sheet processing controller 7 receives a signal indicating, for example, a processing condition received via the user interface (UI) 15. Furthermore, the sheet processing controller 7 receives a detection signal, which indicates that a sheet S has been detected, from the sheet sensor 92. Moreover, the sheet processing controller 7 outputs control signals to the first motor M1 and the second motor M2.

The sheet processing controller 7 includes a central processing unit (CPU), a read-only memory (ROM), a random access memory (RAM), and a hard disk drive (HDD), which are not shown. The CPU executes a processing program. The ROM stores therein, for example, various kinds of programs, various kinds of tables, and parameters. The RAM is used as, for example, a work area when the CPU executes various kinds of programs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sheet processing apparatus comprising:
    a rotating member that is rotatable and that comprises a facing portion that faces a fold section of a sheet,
        wherein the rotating member is configured to rotate so as to switch the facing portion to another facing portion, each facing portion being provided with a protrusion, and
        wherein a set position of the protrusion in an axial direction varies from facing portion to facing portion;
    a switching unit configured to rotate the rotating member so as to switch the facing portion that faces the fold section;
    a pressing unit configured to press the protrusion of the facing portion against the fold section; and
    an opposite member that comprises a protrusion and that is configured to be disposed opposite the rotating member,
    wherein the sheet processing apparatus is configured to nip the fold section between the protrusion of the rotating member and the protrusion of the opposite member.

2. The sheet processing apparatus according to claim 1, wherein the opposite member is rotatable about a rotation axis extending in an axial direction of the rotating member and is rotatable so as to switch a facing portion, which faces the fold section, to another facing portion, and
    wherein each of the facing portions of the opposite member is provided with the protrusion, and a set position of the protrusion in an axial direction of the opposite member varies from facing portion to facing portion.

3. An image forming system comprising:
    an image forming apparatus configured to form an image onto a sheet;
    a folding-process mechanism configured to perform a folding process on the sheet having the image formed thereon by the image forming apparatus; and
    a sheet processing apparatus configured to perform a pressing process on a fold section of the sheet that has undergone the folding process performed by the folding-process mechanism,
    wherein the sheet processing apparatus comprises the sheet processing apparatus according to claim 1.

4. A pair of rotating members configured to nip a fold section of a sheet from opposite sides and that are rotatable,
    wherein each rotating member comprises a facing portion configured to face the fold section of the sheet and to rotate so as to switch the facing portion to another facing portion,
    wherein in each rotating member, the facing portions are each provided with a protrusion, and wherein a set position of the protrusion in an axial direction of the rotating member varies from facing portion to facing portion,
    wherein a first protrusion serving as the protrusion provided in one of the pair of rotating members and a second protrusion serving as the protrusion provided in the other one of the pair of rotating members are configured to face each other with the fold section interposed therebetween, and
    wherein the first protrusion and the second protrusion are configured to nip the fold section.

* * * * *